(12) United States Patent
Sendhoff et al.

(10) Patent No.: US 7,783,583 B2
(45) Date of Patent: Aug. 24, 2010

(54) EVOLUTIONARY SEARCH FOR ROBUST SOLUTIONS

(75) Inventors: Bernhard Sendhoff, Bruchköbel (DE); Hans-Georg Beyer, Wangen (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 634 days.

(21) Appl. No.: 11/517,135

(22) Filed: Sep. 6, 2006

(65) Prior Publication Data
US 2007/0094167 A1    Apr. 26, 2007

(30) Foreign Application Priority Data
Sep. 12, 2005    (EP)    ................... 05019800

(51) Int. Cl.
*G06F 15/18*    (2006.01)
*G06N 3/00*    (2006.01)
*G06N 3/12*    (2006.01)
(52) U.S. Cl. ...................................................... 706/13
(58) Field of Classification Search ........................ None
See application file for complete search history.

(56) References Cited

U.S. PATENT DOCUMENTS

| | | |
|---|---|---|
| 5,074,752 A | 12/1991 | Murphy et al. |
| 5,136,686 A | 8/1992 | Koza |
| 5,148,513 A | 9/1992 | Koza et al. |
| 5,265,830 A | 11/1993 | Allen |
| 5,319,781 A | 6/1994 | Syswerda |
| 5,355,528 A | 10/1994 | Roska et al. |
| 5,461,570 A | 10/1995 | Wang et al. |
| 5,487,130 A | 1/1996 | Ichimori et al. |
| 5,541,848 A | 7/1996 | McCormack et al. |
| 5,724,258 A | 3/1998 | Roffman |

(Continued)

FOREIGN PATENT DOCUMENTS

EP    1205863 A1    5/2002

(Continued)

OTHER PUBLICATIONS

'Performance analysis of evolutionary optimization with cumulative step length adaptation': Arnold, 2004, IEEE, 0018-9286, pp. 617-622.*

(Continued)

*Primary Examiner*—Donald Sparks
*Assistant Examiner*—Peter Coughlan
(74) *Attorney, Agent, or Firm*—Fenwick & West LLP

(57) ABSTRACT

One embodiment of the present invention is a method for optimizing a parameter set comprising object parameters, the method comprising the steps of: (a) creating an initial population of a plurality of individual parameter sets, the parameter sets comprising object parameters describing a model, structure, shape, design or process to be optimized and setting the initial population as a current parent population; (b) for each individual parameter set in a parent population mutating the parameters and optionally recombining the parameters to create an offspring population of individual parameter sets, wherein the strength of an individual object parameter mutation is enlarged by a noise contribution to enhance the robustness of the optimization; (c) evaluating a quality of each individual in the offspring population; (d) selecting individuals of the offspring population to be the next parent generation; and (e) repeating steps (b) through (d) until a termination criterion is reached.

15 Claims, 4 Drawing Sheets

U.S. PATENT DOCUMENTS

| | | | |
|---|---|---|---|
| 5,819,244 | A | 10/1998 | Smith |
| 5,924,048 | A | 7/1999 | McCormack et al. |
| 6,285,968 | B1 | 9/2001 | Motoyama et al. |
| 6,292,763 | B1 | 9/2001 | Dunbar et al. |
| 6,430,993 | B1 | 8/2002 | Seta |
| 6,449,603 | B1 | 9/2002 | Hunter |
| 6,516,309 | B1 | 2/2003 | Eberhart et al. |
| 6,549,233 | B1 | 4/2003 | Martin |
| 6,578,018 | B1 | 6/2003 | Ulyanov |
| 6,606,612 | B1 | 8/2003 | Rai et al. |
| 6,654,710 | B1 | 11/2003 | Keller |
| 6,662,167 | B1 | 12/2003 | Xiao |
| 6,781,682 | B1 | 8/2004 | Kasai et al. |
| 6,879,388 | B2 | 4/2005 | Kasai et al. |
| 6,928,434 | B1 | 8/2005 | Choi et al. |
| 6,950,712 | B2 | 9/2005 | Ulyanov et al. |
| 7,043,462 | B2 | 5/2006 | Jin et al. |
| 7,047,169 | B2 | 5/2006 | Pelikan et al. |
| 2002/0099929 | A1 | 7/2002 | Jin et al. |
| 2002/0138457 | A1 | 9/2002 | Jin et al. |
| 2002/0165703 | A1 | 11/2002 | Olhofer et al. |
| 2003/0030637 | A1 | 2/2003 | Grinstein et al. |
| 2003/0055614 | A1 | 3/2003 | Pelikan et al. |
| 2003/0065632 | A1 | 4/2003 | Hubey |
| 2003/0191728 | A1 | 10/2003 | Kulkami et al. |
| 2004/0014041 | A1 | 1/2004 | Allan |
| 2004/0030666 | A1 | 2/2004 | Marra et al. |
| 2004/0034610 | A1 | 2/2004 | De Lacharriere et al. |
| 2004/0049472 | A1 | 3/2004 | Hayashi et al. |
| 2004/0138846 | A1* | 7/2004 | Buxton et al. ............... 702/108 |
| 2005/0197994 | A1* | 9/2005 | Fujii et al. .................... 706/59 |
| 2005/0209982 | A1 | 9/2005 | Jin et al. |
| 2005/0246297 | A1 | 11/2005 | Chen et al. |

FOREIGN PATENT DOCUMENTS

| | | |
|---|---|---|
| EP | 1205877 A1 | 5/2002 |
| WO | WO 02/057946 A1 | 7/2002 |

OTHER PUBLICATIONS

'Evolution strategies': Beyer, 2002, Natural Computing, pp. 3-52.*
'The theory of evolution strategies': Beyer, 2001, Springer, section 3.1.2, pp. 57-61.*
Agrez, D. "Active Power Estimation by Averaging of the DFT Coefficients," Proceedings of the 17$^{th}$ IEEE Instrumentation and Measurement Technology Conference, May 1-4, 2000, pp. 630-635, vol. 2.
Angeline, Peter J., "Adaptive and Self-Adaptive Evolutionary Computations," Computational Intelligence: A Dynamic Systems Perspective, Palaniswami et al. (EDS), 1995, pp. 152-163.
Back, T et al., "Evolutionary Computation: Comments on the History and Current State," IEEE Transactions on Evolutionary Computation, Apr. 1997, pp. 3-17, vol. 1, No. 1.
Back, T. et al., "A Survey of Evolution Strategies," Proc. of the 4$^{th}$ Intl Conf. On Genetic Algorithms, Jul. 1991, pp. 2-9.
Baluja, S. et al., "Combining Multiple Optimization Runs With Optimal Dependency Trees," Jun. 30, 1997, 12 pages, CMU-CS-97-157, Justsystem Pittsburgh Research Center, Pittsburgh, PA and School Of Computer Science, Carnegie Mellon University, Pittsburgh, PA.
Baluja, S., "Population-Based Incremental Learning: A Method For Integrating Genetic Search Based Function Optimization And Competitive Learning," Population Based Incremental Learning, Jun. 2, 1994, pp. 1-41, CMU-CS-94-163, School Of Computer Science, Carnegie Mellon University, Pittsburgh, PA.
Bosman, P. et al., "Advancing Continuous IDEAs With Mixture Distributions And Factorization Selection Metrics," 6 pages, Institute Of Information And Computing Sciences, Utrecht University, Utrecht, The Netherlands.
Bosman, P. et al., "An Algorithmic Framework For Density Estimation Based Evolutionary Algorithms," Dec. 1999, pp. 1-63, Department Of Computer Science, Utrecht University, Utrecht, The Netherlands.
Bosman, P. et al., "Continuous Iterated Density Estimation Evolutionary Algorithms Within The IDEA Framework," 10 pages, Department Of Computer Science, Utrecht University, Utrecht, The Netherlands.
Bosman, P. et al., "IDEAs Based On the Normal Kernels Probability Density Function," Mar. 2000, pp. 1-16, Department Of Computer Science, Utrecht University, Utrecht, The Netherlands.
Bosman, P. et al., "Mixed IDEAs," Dec. 2000, pp. 1-71, UU-CS-2000-45, Institute Of Information And Computing Sciences, Utrecht University, Utrecht, The Netherlands.
Bosman, P. et al., "Negative Log-Likelihood And Statistical Hypothesis Testing As The Basis Of Model Selection In IDEAs," Aug. 2000, pp. 1-17, Department Of Computer Science, Utrecht University, Utrecht, The Netherlands.
Branke, J. et al., "Faster Convergence By Means Of Fitness Estimation," Oct. 1, 2002, pp. 1-9, Institute AIFB, University of Karlsruhe, Karlsruhe, Germany.
Carson, Y. et al., "Simulation Optimization: Methods and Applications," Proc. of the 29$^{th}$ Winter Simulation Conf., 1997, pp. 118-126.
Chen Y. et al., "Feature Subimage Extraction for Cephalogram Landmarking", Proc. of the 20$^{th}$ Annual International Conference of the IEEE Engineering in Medicine and Biology Society, Oct. 29, 1998, pp. 1414-1417.
Costa, M. et al., "MOPED: A Multi-Objective Parzen-Based Estimation of Distribution Algorithm for Continuous Problems," Polytechnic of Turin, 13 pages, Turin, Italy.
Crump, "Numerical Inversion of Laplace Transforms Using a Fourier Series Approximation," Journal of the ACM (JACM), Jan. 1976, pp. 89-96, vol. 23, No. 1.
Dasgupta, D. et al., "Evolutionary Algorithms in Engineering Applications," 1997, 3-23, Springer-Verlag.
Dash et al., "Genetic Optimization of a Self Organizing Fuzzy-Neural Network for Load Forecasting," IEEE Power Engineering Society Winter Meeting, Jan. 23-27, 2000, pp. 1011-1016, vol. 2.
Deb, K. et al., "A Computationally Efficient Evolutionary Algorithm for Real-Parameter Optimization," KanGAL Report No. 2002003, Apr. 11, 2002, pp. 1-21, Kanpur Genetic Algorithms Laboratory, (KanGAL), Indian Institute Of Technology Kanpur, Tsutsui Kanpur, India.
Deb, K., "Evolutionary Algorithms for Multi-Criterion Optimization in Engineering Design," in Miettinen et al., Evolutionary Algorithms in Engineering and Computer Science, 1999, pp. 135-161, John Wiley and Sons, Ltd:, Chichester, UK.
Deb, K. et al., "A Fast And Elitist Multi-Objective Genetic Algorithm: NSGA-II," KanGAL Report No. 200001, 20 pages, Kanpur Genetic Algorithms Laboratory (KanGAL), Indian Institute Of Technology Kanpur, Kanpur, India.
Deb, K., "A Population-Based Algorithm-Generator For Real-Parameter Optimization," KanGAL Report No. 2003003, 25 pages, Kanpur Genetic Algorithms Laboratory (KanGAL), Indian Institute Of Technology, Kanpur, Kanpur, India.
Deb, K. et al., "Self-Adaptation In Real-Parameter Genetic Algorithms With Simulated binary Crossover," GECCO '99/Genetic Algorithms, 8 pages, Kanpur Genetic Algorithms Laboratory (KanGAL), Department of Mechanical Engineering, Indian Institute Of Technology Kanpur, India and Department of Computer Science/ XI, University of Dortmund, Dortmund, Germany.
Deb, K. et al., "Simulated Binary Crossover for Continuous Search Space," Nov. 1994, pp. 1-33, IITK/ME/SMD-94027, Convenor, Technical Reports, Department Of Mechanical Engineering, Indian Institute Of Technology, Kanpur, India.
De Bonet, J. et al., "MIMIC: Finding Optima By Estimating Probability Densities," Advances in Neural Information Processing Systems, 1997, 8 pages, MIT Press, Cambridge, MA.
Eiben, A. et al., "Parameter Control In Evolutionary Algorithms," IEEE Transactions On Evolutionary Computation, vol. 3, No. 2, 1999, pp. 124-141.
El-Beltagy, M. A. et al., "Metamodeling Techniques For Evolutionary Optimization Of Computationally Expensive Problems: Promises And Limitations," Genetic Algorithms And Classifier Systems, pp. 196-203.

Emmerich, M. et al., "Metamodel—Assisted Evolution Strategies," PPSN VII, LNCS 2439, 2002, pp. 361-370, Springer Verlag, Berlin, Heidelberg.

Eshelman, L. et al., "Crossover Operator Biases: Exploiting the Population Distribution," Proceedings of the Seventh International Conference on Genetic Algorithms, 1997, pp. 354-361.

Eshelman, L. et al., "Real-Coded Genetic Algorithms and Interval-Schemata," Philips Laboratories, pp. 187-202, New York, New York, US.

European Search Report, EP Application No. 00124824.4, Jun. 14, 2001, 3 pages.

European Search Report, EP Application No. 0124825, May 14, 2001, 3 pages.

European Search Report, EP Application No. 01104723, Aug. 22, 2001, 3 pages.

European Search Report, EP Application 04010194, Jun. 7, 2006, 3 pages.

Fagarasan, Florin, Negoita, Dr. Mircea Gh., "A Genetic Algorithm With Variable Length Genotypes. Applications In Fuzzy Modeling," Proceedings Of the Fourth European Congress on Intelligent Techniques, EUFIT '96, vol. 1, Sep. 2-5, 1996, pp. 405-409.

Fukuda, K., "What is Voronoi Diagram in $R^d$?" Aug. 26, 2004, [online] [Retrieved on Aug. 18, 2005] Retrieved from the Internet<URL:http://www.ifor.math.ethz.ch/~fukuda/polyfaq/node29.html>.

"Genetic Algorithms For Optimization Taking Account Of Characteristics Preservation," pp. 1-110.

Graves, R.W. et al., "Acoustic Wavefield Propagation Using Paraxial Explorators," ACM, 1988, pp. 1157-1175.

Grierson, D.E. et al., "Optimal Sizing, Geometrical and Topological Design Using a Genetic Algorithm", Structural Optimization, 1993, pp. 151-159, vol. 6.

Guerin, "ObjectGarden: Evolving the Behavior of Agents via Natural Selection on Weights and Topologies of Neural Networks," May 1999, pp. 1-5.

Gupta, N. et al., "Automated Test Data Generation Using an Iterative Relaxation Method," Proceedings of the $6^{th}$ ACM SIGSOFT International Symposium on Foundations of Software Engineering, ACM SIGSOFT Software Engineering Notes, Nov. 1998, pp. 238-244, vol. 23, No. 6.

Harik, G. et al., "The Compact Genetic Algorithm," IlliGAL Report No. 97006, Aug. 1997, pp. 1-21, Illinois Genetic Algorithms Laboratory, Department Of General Engineering, University Of Illinois At Urbana-Champaign, Urbana, IL.

Harik, G. et al., "The Compact Genetic Algorithm," IEEE, 1998, pp. 523-528.

Harik, G., "Linkage Learning Via Probabilistic Modeling in The ECGA," IlliGAL Technical Report 99010, Jan. 1999, 19 pages, Illinois Genetic Algorithms Laboratory, Department of General Engineering, Urbana, IL.

Ishibuchi, H. et al., "Local Search Procedures In A Multi-Objective Genetic Local Search Algorithm For Scheduling Problems," IEEE, 1999, pp. 665-670.

Jain, A.K. et al., "Data Clustering: A Review," ACM Computing Surveys, Sep. 1999, pp. 264-323, vol. 31, No. 3, Michigan State University, Indian Institute Of Science and The Ohio State University.

Jimenez, D. et al., "Dynamically Weighted Ensemble Neural Networks For Classification," IEEE, 1998, pp. 753-756, The University Of Texas Health Science Center at San Antonio.

Jin, Y. et al., "Connectedness, Regularity And The Success Of Local Search In Evolutionary Multi-Objective Optimization," 8 pages, Honda Research Institute Europe, Offenbach/M, Germany.

Jin, Y. et al., "Fitness Approximation In Evolutionary Computation—A Survey," 8 pages, Future Technology Research, Honda R&D Europe (D) GmbH, Offenbach/Main, Germany.

Jin, Y. et al., "A Framework For Evolutionary Optimization With Approximate Fitness Functions," IEEE Transactions On Evolutionary Computation, Oct. 2002, pp. 481-494, vol. 6, No. 5.

Jin, Y. et al., "On Evolutionary Optimization With Approximate Fitness Functions," 8 pages, Future Technology Research, Honda R&D Europe (D) GmbH, Offenbach/Main, Germany.

Jin Y. et al., "On Generating FC3 Fuzzy Rule Systems from Data Using Evolution Strategies," IEEE Transactions on Systems, Man and Cybernetics, Part B, Dec. 1999, pp. 829-845, vol. 29, No. 6.

Khan, N. et al., "Multi-Objective Bayesian Optimization Algorithm," IlliGAL Report No. 2002009, Mar. 2002, pp. 1-10, Illinois Genetic Algorithms Laboratory, University Of Illinois At Urbana-Champaign, Urbana, IL.

Kim, H-S. et al., "An Efficient Genetic Algorithm with Less Fitness Evaluation by Clustering," Proceedings of the 2001 Congress on Evolutionary Computation, IEEE, May 27-30, 2001, pp. 887-894.

Kita, H. et al., Multi-Parental Extension of the Unimodal Normal Distribution Crossover for Real-Coded Genetic Algorithms,' IEEE, 1999, pp. 1581-1588.

Knowles, J. et al., "The Pareto Archived Evolution Strategy: A New Baseline Algorithm For Pareto Multiobjective Optimisation," IEEE, 1999, pp. 98-105.

Koumoutsakos, P. et al., "Evolution Strategies for Parameter Optimization in Jet Flow Control," Center of Turbulence Research Annual Research Briefs, 1998.

Kvasnicka, V. et al., "Hill Climbing with Learning (An Abstraction of Genetic Algorithm)", Slovak Technical University, 6 pages, Bratislava, Slovakia.

Larranaga, P. et al., "Optimization By Learning And Simulation Of Bayesian And Gaussian Networks," Technical Report EHU-KZAA-IK-4/99, Dec. 31, 1999, pp. 1-70, Intelligent Systems Group, Dept. Of Computer Science And Artificial Intelligence, University Of The Basque Country.

Laumanns, M. et al., "Bayesian Optimization Algorithms For Multi-Objective Optimization," 10 pages, ETH Zurich, Computer Engineering And Networks Laboratory and VUT Brno, Faculty Of Information Technology, Brno.

Li et al., "Text Enhancement in Digital Video Using Multiple Frame Integration," Proceedings of the Seventh ACM International Conference on Multimedia (Part 1), Oct. 1999, pp. 19-22.

Liu, Y. et al., "Negatively Correlated Neural Networks Can Produce Best Ensembles," Australian Journal Of Intelligent Information Processing Systems, Spring/Summer 1997, pp. 176-185, Computational Intelligence Group, School Of Computer Science, University College, Australian Defence Force, The University of South Wales, Canberra, Australia.

Liu, Y. et al., "Evolutionary Ensembles With Negative Correlation Learning," pp. 1-27, The University Of Aizu, Fukushima Japan, The University Of Birmingham, Birmingham, U.K. and Evolvable Systems Laboratory, Computer Science Division, Ibaraki, Japan.

Liu, Y. et al., "Simultaneous Training Of Negatively Correlated Neural Networks In An Ensemble," IEEE Transactions On Systems, Man, And Cybernetics—Part B: Cybernetics, Dec. 1999, pp. 716-725, vol. 29, No. 6.

Lobo, F. et al., "Extended Compact Genetic Algorithm In C++," IlliGAL Report 99016, Jun. 1999, pp. 1-4, Illinois Genetic Algorithms Laboratory, Department Of General Engineering, University Of Illinois At Urbana-Champaign, Urbana, IL.

Lohn, J.D. et al., "A Comparison Of Dynamic Fitness Schedules For Evolutionary Design Of Amplifiers," 6 pages.

Mitlohner, "Classifier Systems and Economic Modeling," Proceedings of the Conference on Designing the Future, ACM SIGAPL APL Quote Quad, Jun. 1996, pp. 77-86, vol. 26, No. 4.

Muhlenbein, H., "The Equation For The Response To Selection And Its Use For Prediction," pp. 1-46, RWCP Theoretical Foundation GMD Laboratory, Sankt Augustin.

Muhlenbein, H. et al., "Evolutionary Algorithms: From Recombination To Search Distributions," pp. 1-39, RWCP Theoretical Foundation GMD Laboratory, Sankt Augustin.

Muhlenbein, H. et al., "Evolutionary Synthesis Of Bayesian Networks For Optimization," MIT Press Math6×9, Sep. 1999, pp. 1-27.

Muhlenbein, H. et al., "The Factorized Distribution Algorithm For Additively Decomposed Functions," Proceedings Of The 1999 Congress on Evolutionary Computation, 1999, IEEE Press, pp. 752-759, Real World Computing Partnership, Theoretical Foundation GMD Laboratory, Sankt Augustin, Germany.

Muhlenbein, H. et al., "FDA—A Scalable Evolutionary Algorithm For The Optimization Of Additively Decomposed Functions," Evolutionary Computation, 1999, pp. 45-68, vol. 7, No. 1, Theoretical Foundation GMD Lab, Real World Computing Partnership, GMD FZ Informationstechnik, St. Augustin.

Muhlenbein, H. et al., "From Recombination Of Genes To The Estimation Of Distributions I. Binary Parameters," 10 pages, GMD—Forschungszentrum Informationstechnik, Sankt Augustin, Germany.

Muller, S. et al., "Application of Machine Learning Algorithms to Flow Modeling and Optimization," Center of Turbulence Research Annual Research Briefs, 1999.

Okabe, T. et al., "Evolutionary Multi-Objective Optimisation With A Hybrid Representation," 8 pages, Honda Research Institute Europe, Offenbach/M, Germany.

Ono, I. et al., "A Real-Coded Genetic Algorithm for Function Optimization Using Unimodal Normal Distribution Crossover," Proceedings of the Seventh International Conference on Genetic Algorithms, pp. 246-253, 1997.

Ono, I. et al., "A Real-Coded Genetic Algorithm For Function Optimization Using The Unimodal Normal Distribution Crossover," Technical Papers, 1999, pp. 1-11, University Of Tokushima, Tokushima, Japan, National Defence Academy, Yokosuka, Japan and Tokyo Institute Of Technology, Yokohama, Japan.

Ono, I. et al., "A Robust Real-Coded Genetic Algorithm Using Unimodal Normal Distribution Crossover Augmented By Uniform Crossover: Effects For Self-Adaptation Of Crossover Probabilities," 8 pages, University of Tokushimsa, Tokushima, Japan, Tokyo Institute Of Technology, Yokohama, Japan and Tokyo Institute Of Technology, Yokohama, Japan.

Optiz, D. et al., "Generating Accurate And Diverse Members Of A Neural-Network Ensemble," Advances in Neural Information Processing Systems 8, 7 pages, MIT Press, Cambridge, MA, Computer Science Department, University Of Minnesota, Duluth, MN and Computer Sciences Department, University Of Wisconsin, Madison, WI.

Paul, T. et al, "Reinforcement Learning Estimation Of Distribution Algorithm," 12 pages, Graduate School Of Frontier Sciences, The University Of Tokyo, Tokyo, Japan.

Pelikan, M. et al., "BOA: The Bayesian Optimization Algorithm," 8 pages, Illinois Genetic Algorithms Laboratory, Department Of General Engineering, University Of Illinois At Urbana-Champaign.

Pelikan, M. et al., "BOA: The Bayesian Optimization Algorithm," IlliGAL Report No. 99003, Jan. 1999, pp. 1-12, Illinois Genetic Algorithms Laboratory, University Of Illinois At Urbana-Champaign, Urbana, IL.

Pelikan, M. et al., "Linkage Problem, Distribution Estimation, And Bayesian Networks," IlliGAL Report No. 98013, Nov. 1998, pp. 1-24, Illinois Genetic Algorithms Laboratory, University Of Illinois At Urbana-Champaign, Urbana, IL.

Pelikan, M. et al., "Marginal Distributions in Evolutionary Algorithms," pp. 1-6, Slovak Technical University, Bratislava, Slovakia and GMD Forschungszentrum Informationstechnik, Sankt Augustin, Germany.

Pelikan, M. et al., "A Survey of Optimization By Building And Using Probabilistic Models," IlliGAL Report No. 99018, Sep. 1999, pp. 1-11, Illinois Genetic Algorithms Laboratory, University of Illinois At Urbana-Champaign, Urbana, IL.

Perrone, M. et al., "When Networks Disagree: Ensemble Methods For Hybrid Neural Networks," Oct. 27, 1992, 15 pages, Physics Department, Neuroscience Department, Institute For Brain And Neural Systems, Brown University, Providence, R.I., To Appear in "Neural Networks For Speech And Image Processing," R.J. Mammone, ed., Chapman-Hall, 1993.

Pittman, J. et al., "Fitting Optimal Piecewise Linear Functions Using Genetic Algorithms," IEEE Transactions on Pattern Analysis and Machine Intelligence, Jul. 2000, pp. 701-718, vol. 22, Issue 7.

Ratle, a., "Accelerating the Convergence of Evolutionary Algorithms by Fitness Landscape Approximation", Parallel Problem Solving from Nature—PPSN V. 5$^{th}$ International Conference Proceedings, Sep. 1998, pp. 87-96.

Ratle, A., "Optimal Sampling Strategies for Learning a Fitness Model", Proc. of 1999 Congress on Evolutionary Computation, Jul. 9, 1999, pp. 2078-2085, vol. 3.

Redmond, J., "Actuator Placement Based on Reachable Set Optimization for Expected Disturbance", Journal of Optimization Theory and Applications, Aug. 1996, pp. 279-300. vol. 90, No. 2.

Rosen, B., "Ensemble Learning Using Decorrelated Neural Networks," To Appear In Connections Science, pp. 1-14, Computer Science Division, University Of Texas At San Antonio, San Antonio, TX.

Rousseeuw, P., "Silhouettes: A Graphical Aid To The Interpretation And Validation Of Cluster Analysis," Journal Of Computational And Applied Mathematics, 1987, pp. 53-65, vol. 20, University Of Fribourg, Fribourg, Switzerland.

Rudlof, S. et al., "Stochastic Hill Climbing With Learning By Vectors Of Normal Distributions," Aug. 5, 1996, pp. 1-11, Fraunhofer-Institut For Production Systems And Design Technology (IPK), Berlin.

Sbalzarini, I. et al., "Evolutionary Optimization for Flow Experiments," Center of Turbulence Research Annual Research Briefs, 2000.

Sebag, M. et al., "Extending Population-Based Incremental Learning To Continuous Search Spaces," 10 pages, Ecole Polytechnique, Palaiseau Cedex and Universite d'Orsay, Orsay Cedex.

Sendhoff, "Evolutionary Optimised Ontogenetic Neural Networks with Incremental Problem Complexity During Development," Proceedings of the 2000 Congress on Evolutionary Computation, Jul. 16-19, 2000, pp. 1443-1450, vol. 2.

Srikanth, R. et al., "A Variable-Length Genetic Algorithm For Clustering And Classification," Pattern Recognition Letters, North-Holland Publ. Amsterdam, NL, vol. 16, No. 8, Aug. 1, 1995, pp. 789-800.

Takahashi, M. et al., "A Crossover Operator Using Independent Component Analysis for Real-Coded Genetic Algorithms," Tokyo Institute of Technology and National Institution for Academic Degrees, 7 pages, Japan.

Thierens, D. et al., "Multi-Objective Mixture-Based Iterated Density Estimation Evolutionary Algorithms," 8 pages, Institute Of Information And Computing Sciences, Utrecht University, Utrecht, The Netherlands.

Tsutsui, S. et al., "Evolutionary Algorithm Using Marginal Histogram Models In Continuous Domain," IlliGAL Report No. 2001019, Mar. 2001, pp. 1-16, Illinois Genetic Algorithms Laboratory, University of Illinois At Urbana-Champaign, Urbana, Illinois.

Tsutsui, S. et al., "Multi-Parent Recombination With Simplex Crossover in Real Coded Genetic Algorithms," 8 pages, Department Of Management And Information Science, Hannan University, Osaka, Japan and Graduate School Of Interdisciplinary Science And Engineering, Tokyo Institute of Technology, Yokohama, Japan.

Tsutsui, S., "Sampling Bias And Search Space Boundary Extension In Real Coded Genetic Algorithms," 8 pages, Department Of Management And Information Science, Hannan University, Osaka, Japan.

Tsutsui, S. et al., "Search Space Boundary Extension Method In Real-Coded Genetic Algorithms," Information Sciences, May 2001, pp. 229-247, vol. 133, No. 3-4, Department Of Management And Information Science, Hannan University, Osaka, Japan and Illinois Genetic Algorithms Laboratory, University of Illinois At Urbana-Champaign, Urbana, IL.

Tsutsui, S. et al., "Simplex Crossover And Linkage Identifications: Single-Stage Evolution VS. Multi-Stage Evolution," IEEE, 2002, 6 pages, Department Of Management And Information, Hannan University, Osaka, Japan and Illinois Genetic Algorithms Laboratory, Department Of General Engineering, University of Illinois At Urbana-Champaign, Urbana, IL.

Tsutsui, S. et al., "Simplex Crossover and Linkage Learning In Real-Coded GAs," Genetic Algorithms: Poster Paper, p. 785, Department Of Management And Information Science, Hannan University, Osaka, Japan and Illinois Genetic Algorithms Laboratory, University Of Illinois At Urbana-Champaign, Urbana, IL.

Tsutsui, S. et al., "Probabilistic Model-Building Genetic Algorithms Using Marginal Histograms In Continuous Domain," KES' 01, N. Baba et al. (Eds.), IOS Press, 2001, pp. 112-121, Department of Management And Information, Hanan University, Osaka, Japan and Illinois Genetic Algorithms Laboratory, Department Of General Engineering, University Of Illinois At Urbana-Champaign, Urbana, IL Tuson, A. et al., "Adapting Operator Settings In Genetic Algorithms," Final Draft of The Paper Which Will Appear In *Evolutionary Computation*, Mar. 25, 1998, pp. 1-17.

Ueda, T. et al., "Efficient Numerical Optimization Technique Based On Real-Coded Genetic Algorithm," Genome Informatics, 2001, pp. 451-453, vol. 12, Graduate School Of Bioresource And Bioenvironmental Sciences, Kyushu University, Fukuoka, Japan and Department Of Biochemical Engineering and Science, Kyushu Institute Of Technology, Fukuoka, Japan.

Ulmer, H. et al., "Model-Assisted Steady-State Evolution Strategies," 12 pages, Center for Bioinformatics Tübingen (ZBIT), University of Tübingen, Tübingen, Germany.

Van Veldhuizen, D. A. et al., "Multiobjective Evolutionary Algorithms: Analyzing the State-of-the-Art," Evolutionary Computation, 2000, 125-147, vol. 8, No. 2, The MIT Press, Cambridge, MA.

Weinert, K. et al., "Discrete NURBS-Surface Approximation Using An Evolutionaary Strategy," REIHE CI 87/00, SFB 531, 2000, pp. 1-7.

Yao, X. et al., "Making Use Of Population Information In Evolutionary Artificial Neural Networks," IEEE Transactions On Systems, Man, And Cybernetics, Jun. 1998, pp. 417-425, vol. 28, No. 3.

Yu et al., "Genetic Algorithm Approach to Image Segmentation using Morphological Operations", Image Processing, ICIP 1998, IEEE, Oct. 1998, pp. 775-779, vol. 3.

Zhang, B., "A Bayesian Framework for Evolutionary Computation," IEEE, 1999, pp. 722-728.

Zhang, B. et al., "Building Optimal Committees Of Genetic Programs," pp. 1-10, Artificial Intelligence Lab (SCAI) School Of Computer Science And Engineering, Seoul National University, Korea.

Yao, X. et al., "Making Use of Population Information in Evolutionary Artificial Neural Networks," IEEE Transactions on Systems, Man, and Cybernetics—Part B: Cybernetics, Jun. 1998, pp. 417-425, vol. 28, No. 3.

Hasenjager, M. et al., "Three Dimensional Evolutionary Aerodynamic Design Optimization with CMA-ES," Genetic and Evolutionary Computation Conference (GECCO '05), Jun. 25-29, 2005, pp. 2173-2180.

Nashvili, M. et al., "Morphing Methods in Evolutionary Design Optimization," Genetic and Evolutionary Computation Conference, (GECCO '05), Jun. 25-29, 2005, pp. 897-904.

Olhofer, M. et al., "Adaptive Encoding for Aerodynamic Shape Optimization Using Evolution Strategies," Proceedings of the IEEE Congress on Evolutionary Computation, May 2001, pp. 576-583, vol. 1.

European Search Report, EP 05019800.1, Oct. 31, 2006, 4 Pages.

Hruschka, E.R. et al., "Using a Clustering Genetic Algorithm for Rule Extraction from Artificial Neural Networks," IEEE, 2000, pp. 199-206.

Kim, H.S. et al., "An Efficient Genetic Algorithm with Less Fitness Evaluation by Clustering," IEEE, 2001, pp. 887-894.

Li, M. et al, "Hybrid Evolutionary Search Method Based on Clusters," IEEE Transaction on Pattern Analysis and Machine Intelligence, Aug. 2001, pp. 786-799, vol. 23, No. 8.

Liu, F. et al., "Designing Neural Networks Ensembles Based on the Evolutionary Programming," Proceedings of the Second International Conference on Machine Learning and Cybernetics, Xi'an, IEEE, Nov. 2-5, 2003, pp. 1463-1466.

Zhou, Z.H. et al., "Genetic Algorithm Based Selective Neural Networks Ensemble," Proceedings of the 17th International Joint Conference on Artificial Intelligence, IEEE, 2001, pp. 797-802, vol. 2.

* cited by examiner $g := 0;$ $\langle \sigma \rangle := \sigma^{(\text{init})};$ $\langle x \rangle := x^{(\text{init})};$ $\mu := \mu^{(\text{init})};$ $\lambda := \lceil \mu/\vartheta \rceil;$ $\overline{x} := \langle x \rangle;$

For $i := 1$ To $N;$ $\overline{x_i^2} := \langle x_i^2 \rangle;$ End For

$\varepsilon := \varepsilon^*;$ $\langle F \rangle^{(g)} := \frac{1}{\mu} \sum_{m=1}^{\mu} f\left(x^{(\text{init})} + \mathcal{N}_m(0, \varepsilon^*)\right);$ $\overline{\Delta F} := 0;$

Repeat

For $l := 1$ To $\lambda$ $\tilde{\sigma}_l := \langle \sigma \rangle \exp[\tau_\sigma \mathcal{N}_l(0, 1)];$

For $i := 1$ To $N;$ $(\tilde{x}_l)_i := \langle x_i \rangle + \sqrt{\tilde{\sigma}_l^2 + \varepsilon_i^2} \, \mathcal{N}_{l,i}(0, 1);$ End For

$\tilde{F}_l := f(\tilde{x}_l);$

End For

$g := g + 1;$ $\langle \sigma \rangle := \frac{1}{\mu} \sum_{m=1}^{\mu} \tilde{\sigma}_{m;\lambda};$ $\langle x \rangle := \frac{1}{\mu} \sum_{m=1}^{\mu} \tilde{x}_{m;\lambda};$

For $i := 1$ To $N$ $\langle x_i^2 \rangle := \frac{1}{\mu} \sum_{m=1}^{\mu} (\tilde{x}_{m;\lambda})_i^2;$ $\overline{x_i} := (1 - c_x)\overline{x_i} + c_x \langle x_i \rangle;$ $\overline{x_i^2} := (1 - c_x)\overline{x_i^2} + c_x \langle x_i^2 \rangle;$ $D_i := \sqrt{\overline{x_i^2} - \overline{x_i}^2};$ $\varepsilon_i := \varepsilon_i \exp[\tau_\varepsilon \text{Sign}(\varepsilon_i^* - D_i)];$

End For

$\langle F \rangle^{(g)} := \frac{1}{\mu} \sum_{m=1}^{\mu} \tilde{F}_{m;\lambda};$ $\overline{\Delta F} := (1 - c_f)\overline{\Delta F} + c_f \left(\langle F \rangle^{(g)} - \langle F \rangle^{(g-1)}\right);$

If $(\text{Mod}(g, \Delta g) = 0) \wedge (\overline{\Delta F} \leq 0)$ Then

$\mu := \lceil \mu c_\mu \rceil;$ $\lambda := \lceil \mu/\vartheta \rceil;$

End If

Until Termination_Condition

Fig. 3

$g := 0;$ $\sigma := \sigma^{(init)};$ $\langle x \rangle^{(g)} := x^{(init)};$ $\mu := \mu^{(init)};$ $\lambda := \lceil \mu/\vartheta \rceil;$ $\overline{x^a} := \langle x \rangle;$ For $i := 1$ To $N;$ $\overline{x_i^{a2}} := \langle x_i^2 \rangle;$ End For $\varepsilon := \varepsilon^*;$ $\langle F \rangle^{(g)} := \frac{1}{\mu} \sum_{m=1}^{\mu} f\left(x^{(init)} + \mathcal{N}_m(0, \varepsilon^*)\right);$ $\overline{\Delta F} := 0;$ $s := 0;$

Repeat

For $l := 1$ To $\lambda$ $\tilde{x}_l := \langle x \rangle^{(g)} + \sigma \mathcal{N}_l(0, 1);$ $\tilde{x}_l^a := \tilde{x}_l + \mathcal{N}_l(0, \varepsilon);$ $\tilde{F}_l := f(\tilde{x}_l^a);$ End For $g := g + 1;$ $\langle x \rangle^{(g)} := \frac{1}{\mu} \sum_{m=1}^{\mu} \tilde{x}_{m;\lambda};$ $s := (1 - c_\sigma)s + \sqrt{(2 - c_\sigma)c_\sigma} \frac{\sqrt{\mu}}{\sigma} \left(\langle x \rangle^{(g)} - \langle x \rangle^{(g-1)}\right)$ $\sigma := \sigma \exp\left[\frac{\|s\|^2 - N}{2Nd_\sigma}\right];$ For $i := 1$ To $N$ $\langle x_i^a \rangle := \frac{1}{\mu} \sum_{m=1}^{\mu} (\tilde{x}_{m;\lambda}^a)_i;$ $\langle x_i^{a2} \rangle := \frac{1}{\mu} \sum_{m=1}^{\mu} (\tilde{x}_{m;\lambda}^a)_i^2;$ $\overline{x_i^a} := (1 - c_x)\overline{x_i^a} + c_x \langle x_i^a \rangle;$ $\overline{x_i^{a2}} := (1 - c_x)\overline{x_i^{a2}} + c_x \langle x_i^{a2} \rangle;$ $D_i := \sqrt{\overline{x_i^{a2}} - \overline{x_i^a}^2};$ $\varepsilon_i := \varepsilon_i \exp[\tau_\varepsilon \text{Sign}(\varepsilon_i^* - D_i)];$ End For $\langle F \rangle^{(g)} := \frac{1}{\mu} \sum_{m=1}^{\mu} \tilde{F}_{m;\lambda};$ $\overline{\Delta F} := (1 - c_f)\overline{\Delta F} + c_f \left(\langle F \rangle^{(g)} - \langle F \rangle^{(g-1)}\right);$ If $(\text{Mod}(g, \Delta g) = 0) \wedge (\overline{\Delta F} \leq 0)$ Then $\mu := \lceil \mu c_\mu \rceil;$ $\lambda := \lceil \mu/\vartheta \rceil;$ End If

Until Termination_Condition

Fig. 4

EVOLUTIONARY SEARCH FOR ROBUST SOLUTIONS

RELATED APPLICATIONS

This application is related to U.S. patent application Ser. No. 10/007,906 and U.S. patent application Ser. No. 10/080,742 which are incorporated by reference herein in their entirety.

FIELD OF THE INVENTION

The present invention relates generally to the optimization of designs, models, structures and. shapes, for example in fluid-dynamic applications such as the design of an aircraft wing, a gas turbine or a compressor blade. In particular, it relates to the optimization of such designs using Evolutionary Algorithms (EAs).

BACKGROUND OF THE INVENTION

In the field of evolutionary algorithms, basic principles of natural evolution are used for generating or optimizing technical structures. Basic operations are mutation and recombination as a method for modifying structures or parameters. To eliminate unfavorable modifications and to proceed with modifications which increase the overall quality of the system, a selection operation is used. Principles of the evolution strategy can be found for example in Rechenberg, Ingo (1994) *"Evolutionsstrategie"*, Friedrich Frommann Holzboog Verlag, which is incorporated by reference herein in its entirety.

The application of EAs in the optimization of designs is well known, see for example the book *"Evolutionary Algorithms in Engineering Applications"* by D. Dasgupta and Z. Michalewicz, Springer Verlag, 1997, which is incorporated by reference herein in its entirety.

As evolutionary algorithms are more and more successfully used as optimization tools for large-scale "real-world" problems, the influence of noise on the performance and the convergence properties of evolutionary algorithms have come into focus.

Quality evaluations in optimization processes are frequently noisy due to design uncertainties concerning production tolerances or actuator imprecision acting directly on the design variables x. That is, the performance $f$ of a design becomes a stochastic quantity $\tilde{f}$ via internal design perturbations $$\tilde{f}(x)=f(x+\delta), \delta\text{-random vector,}$$

where the random vector $\delta$ obeys a certain unknown distribution (often modeled as a Gaussian distribution) and $$E[\delta]=0.$$

This means, given a design x, evaluating its quality $\tilde{f}(x)$ necessarily yields stochastic quantity values. As a result, an optimization algorithm applied to $\tilde{f}(x)$ must deal with these uncertainties and it must use this information to calculate a robust optimum based on an appropriate robustness measure.

Probably the most widely used measure is the expected value of $\tilde{f}(x)$, that is $$E[\tilde{f}|x].$$

Assuming a continuous design space, the expected value robustness measure is given by the integral $$E[\tilde{f}|x] = \int_{\mathbb{R}^N} f(x+\delta)p(\delta)d^N\delta$$

and the optimal design x is formally obtained by $$\hat{x} = \arg opt_x \int_{\mathbb{R}^N} f(x+\delta)p(\delta)d^N\delta.$$

If one were able to calculate $$E[\tilde{f}|x]$$

analytically, the resulting optimization problem would be an ordinary one, and standard (numerical) optimization techniques could be applied. However, real-world applications will usually not allow for an analytical treatment, therefore one has to rely on numerical estimates of $$E[\tilde{f}|x]$$

using Monte-Carlo simulations. Alternatively one can use direct search strategies capable of dealing with the noisy information directly.

The latter is the domain of evolutionary algorithms (EAs). In particular, evolutionary algorithms have been shown to cope with such stochastic variations better than other optimization algorithms, see e.g. *"On the robustness of population-based versus point-based optimization in the presence of noise"* by V. Nissen and J. Propach, IEEE Transactions on Evolutionary Computation 2(3):107-119, 1998, which is incorporated by reference herein in its entirety.

A conventional technique to find approximate solutions to the above equation using EAs is to use the design uncertainties $\delta$ explicitly. That is, given an individual design x, the perturbation $\delta$ is explicitly added to the design x. While the EA works on the evolution of x, the goal function in the black-box is evaluated with respect to $\tilde{x}:=x+\delta$. Since in center of mass evolution strategies an individual offspring design is the result of a mutation z applied to a parental individual and the parental centroid $\langle x \rangle$), respectively, the actually design tested is $$\tilde{x}:=\langle x \rangle+z+\delta.$$

Taking now another perspective, one might interpret $z+\delta$ as a mutation in its own right. This raises the question whether it is really necessary to artificially add the perturbation in a black-box to the design x. As an alternative one might simply use a mutation $\tilde{z}=z+\delta$ with a larger mutation strength instead of z. In other words, the mutations themselves may serve as robustness tester.

However, even though evolutionary algorithms/strategies are regarded as well suited for noisy optimization, its application to robust optimization bears some subtleties/problems: due to selection, the robustness of a design x is not tested with respect to samples of the density function $p(\delta)$. Selection prefers those designs which are by chance well adopted to the individual realizations of the perturbation δ.

For example, when considering actuator noise of standard deviation ε on a sphere model $\|x\|^2$ (to be minimized), the actually measured standard deviation $D_i$ of a specific component i of the parent population will usually be smaller, i.e. $D_i < \sigma$. This is so, because selection singles out all those $x+\delta$ states with large length $\|x+\delta\|$. That is, shorter δ vectors are preferred resulting in a smaller measured standard deviation. Therefore, an evolutionary algorithm for robust optimization must take into account this effect and take appropriate counter measures.

Furthermore, it is well known that noise deteriorates the performance of the evolutionary algorithms. If the function to be optimized is noisy at its global or local optimizer, the evolutionary algorithm cannot reach the optimizer in expectation. That is, the parental individuals are located in the long run (steady state behavior) in a certain (expected) distance to the optimizer, both in the object parameter space and usually also in the quality/fitness space.

What is needed is an improved system and method (1) for evaluating the robustness of an Evolutionary Algorithm; (2) where the observed parental variance is controlled such that robustness (with regard to noise etc.) is tested correctly; and/or (3) for optimization that is driven by the trade-off between reducing the residual distance (induced by the noise) to the optimizer state and reducing the number of required fitness evaluations. In other words, such a method for optimization can reduce the residual distance (induced by the noise) to the optimizer state while at the same time minimizing the required additional fitness evaluation effort.

SUMMARY OF THE INVENTION

A system and method (1) for evaluating the robustness of an Evolutionary Algorithm; (2) where the observed parental variance is controlled such that robustness (with regard to noise etc.) is tested correctly; and/or (3) for optimization that is driven by the trade-off between reducing the residual distance (induced by the noise) to the optimizer state and reducing the number of required fitness evaluations. In other words, such a method for optimization can reduce the residual distance (induced by the noise) to the optimizer state while at the same time minimizing the required additional fitness evaluation effort.

One embodiment of the present invention is a method for optimizing a parameter set comprising object parameters, the method comprising the steps of: (a) creating an initial population of a plurality of individual parameter sets, the parameter sets comprising object parameters describing a model, structure, shape, design or process to be optimized and setting the initial population as a current parent population; (b) for each individual parameter set in a parent population mutating the parameters and optionally recombining the parameters to create an offspring population of individual parameter sets, wherein the strength of an individual object parameter mutation is enlarged by a noise contribution to enhance the robustness of the optimization; (c) evaluating a quality of each individual in the offspring population; (d) selecting individuals of the offspring population to be the next parent generation; and (e) repeating steps (b) through (d) until a termination criterion is reached.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE FIGURES

FIG. 3 is pseudocode representing one implementation according to one embodiment of the present invention.

FIG. 4 is pseudocode representing one implementation according to another embodiment of the present invention.

DETAILED DESCRIPTION OF THE INVENTION

Figure 1:
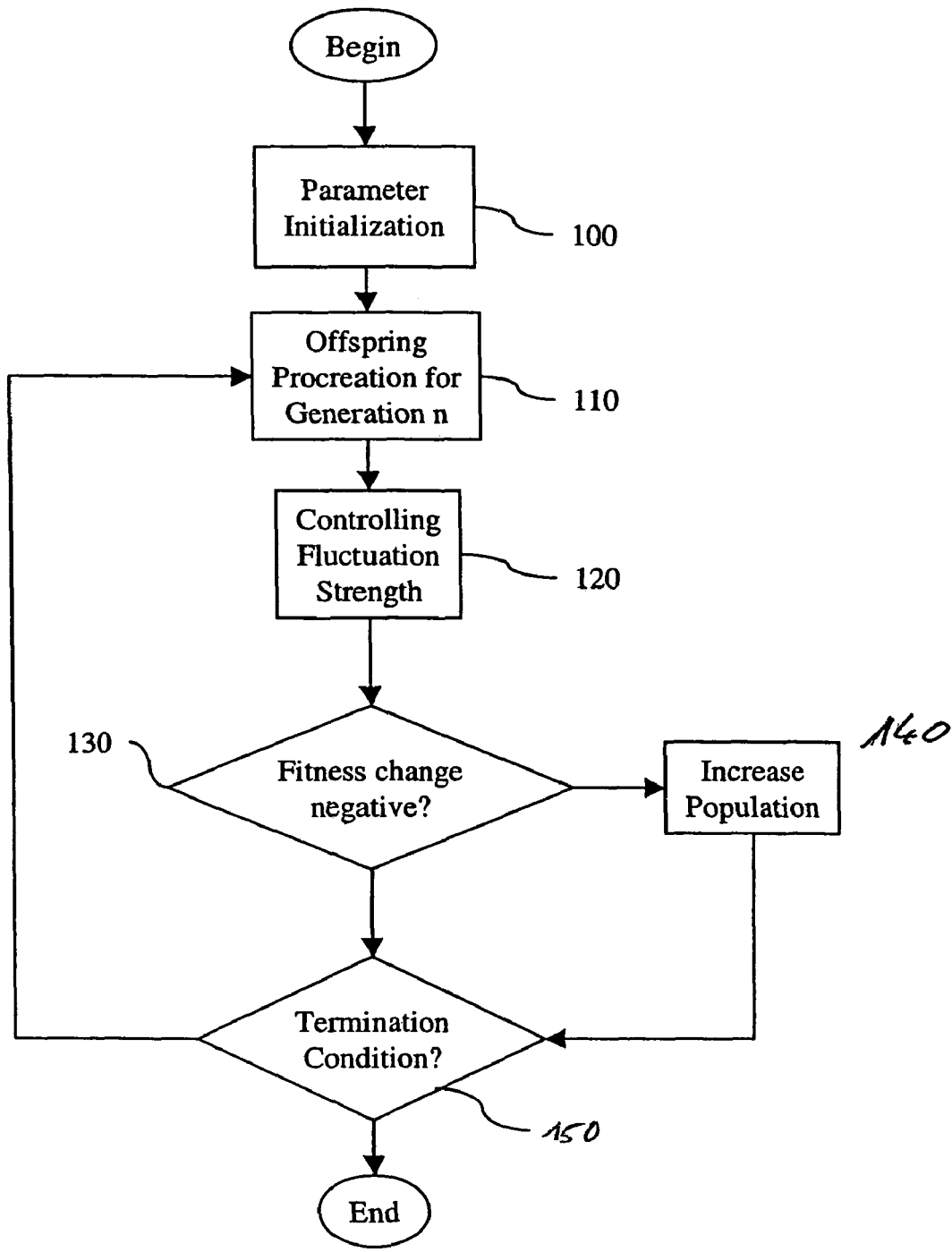
FIG. 1 is a schematic flow diagram of the optimization method according one embodiment of the present invention

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

1. Notational Conventions

In order to unify/simplify the notations for the pseudo code description of the algorithms the following conventions will be used: g is the generation (time) counter, it appears as parenthesized superscript on the respective quantities. The i-th component of a vector x is denoted by $x_i$. Vectors are always denoted by boldface letters in the following. In order to refer to the i-th component of a vector x we will alternatively write $(x)_i$, that is $(x)_i \equiv x_i$. N denotes the object parameter space dimension. $x \in R^N$ is the N-dimensional object parameter vector. $\sigma$ is referred to as the mutation strength being the standard deviation of the normally distributed mutations. $\mu$ is the parental population size. Quantities related to parental individuals are indexed by subscript m. $\lambda$ is the number of offspring generated in a single generation. Quantities related to offspring individuals are indexed by subscript l and are denoted with a tilde. $\theta$ is an exogenous strategy parameter called truncation ratio, defined as $$\vartheta := \frac{\mu}{\lambda}$$

Normally distributed random variables/numbers y are denoted by $N(\bar{y};\sigma^2)$ where $\bar{y}$ is the expected value of y and $\sigma$ its standard deviation. A vector y of normally distributed random variables is symbolized by $N(\bar{y}; V)$, where $\bar{y}$ is the expected value vector of y and V stands either for the covariance matrix C or the vector of standard deviations, whereby the off-diagonal elements of C are assumed to be zero and the diagonal elements are $\epsilon^2_i$. In the latter case the density function reads for the actuator noise strength vector $\epsilon$. The subscript notation m; $\lambda$ denotes quantities of the mth-best individual, i.e., that individual being the mth-largest (in the case of maximization) or smallest (in the case of minimization) with respect to its observed (measured) fitness $f(x)$. $\langle y \rangle$ denotes the parental population average, i.e.

$$\langle y \rangle := \frac{1}{\mu} \sum_{m=1}^{\mu} y_m.$$

This is basically a centroid calculation. Overlined symbols, such as $\bar{x}_i$, when used in an algorithm, are used to denote averaging over time, i.e. usually this is a weighted average over the generations g. R is the length of the centroid state $$R := \|\langle x \rangle\|.$$

r is the length of the first N–1 components of the vector x $$r := \sqrt{\sum_{i=1}^{N-1} x_i^2}$$

FIG. 1 shows a first embodiment of the invention, which takes advantage of the idea of direct robustness testing via mutations.

a. Parameter Iinitialization

In step 100, the basic parameters of the optimization algorithm are initialized.

The generation g is set to a start value (0). The mutation strength $\sigma$, the population size $\lambda$ and the number of offspring generated in a single generation $\lambda$ are all set to initial values, whereby the number of offspring depends on the truncation ratio $\theta$. The recombinant $\langle x \rangle$ is set to an initial vector $x^{(init)}$.

b. Procreation of Offspring for Generation n

In step 110, the procreation of the $\lambda$ offspring is realized.

First, a log-normal mutation of the recombined strategy parameter $\sigma$ is performed:

$$\sigma_l := \langle \sigma \rangle \exp[\tau_\sigma N_l(0,1)] \tag{1}$$

where $\tau_\sigma$ is an exogenous strategy parameter, the so-called learning parameter. In order to ensure linear convergence order of the evolutionary algorithm on the sphere, it is known to be sufficient to ensure that $\tau_\sigma \propto 1/\sqrt{N}$, such that $$\tau_\sigma = \frac{1}{\sqrt{N}} \tag{2}$$

is a reasonable choice.

The new recombination of the strategy parameter is calculated as $$\langle \sigma \rangle := \frac{1}{\mu} \sum_{m=1}^{\mu} \tilde{\sigma}_{m;\lambda} \tag{3}$$

Secondly, a mutation of the object parameter is performed on top of the recombinant $\langle x \rangle$:

$$(\tilde{x}_l)_i := \langle x_i \rangle + \sqrt{\sigma_l^2 + \epsilon_i^2} N_{l,i}(0,1) \tag{4}$$

where $l=1, \ldots, \lambda$ and $i=1, \ldots, N$ and the new recombinant $\langle x \rangle$ is calculated as $$\langle x \rangle := \frac{1}{\mu} \sum_{m=1}^{\mu} \tilde{x}_{m;\lambda} \qquad (5)$$

At this point, it is to be noted that the actual strength by which the mutation is performed differs from the known "standard" evolution strategy: In order to account for noise (actuator noise etc.), the strength consists of the evolution strategy specific contribution σ and an additional noise contribution ϵ. Since normality of the noise is assumed, the sum of the strategy-specific mutation contribution and the noise contribution is still a normally distributed random vector, however, with variance $\tilde{\sigma}_l^2 + \epsilon_i^2$ for the i-th component. Performing the mutations in this way allows for taking advantage of the evolution strategy immanent mutation (of strength $\sigma_l$) as an additional robustness tester. That is, there is no need to evolve the EA's mutation strength down to very small values since it can take over a part of the robustness testing itself.

c. Controlling Mutation Strength (Robustness Variance Control)

In step 120, the strength of the mutation of the object parameter (cf. equation 4) is controlled by (a) measuring the parental population variance or its standard deviation $D_i$ and (b) adjusting the $\epsilon_i$ accordingly.

With regard to substep (a), it must be noted that, since robustness testing is highly noisy, calculating the parental population variance from just one generation results in highly fluctuating $D_i$ estimates not well suited for $\epsilon_i$ control. Therefore, a smooth $D_i$ estimate is needed. One way of smoothing the data is by weighted accumulation, also known as exponential averaging. Since $$D_i = \sqrt{\overline{x_i^2} - \overline{x_i}^2} \qquad (6)$$

$D_i$ can be obtained from the smoothed time averages of $x_i$ and $x_i^2$. The exponential averaging is designed in such a way that the $x_i$ and $x_i^2$ information fades away exponentially fast if $\langle x_i \rangle$ and $\langle x_i^2 \rangle$, respectively, are zero. The time constant by which this process happens is controlled by the accumulation time constant $c_x \in [0,1]$. Since the changing rates of the evolution strategy (e.g. the progress rate on the sphere) are often of the order 1/N, it is reasonable to use $$c_x = \frac{1}{N} \qquad (7)$$

as a first choice.

With regard to substep (b), it is to be noted that the actual mutation strength depends on σ and $\epsilon_i$. It is important to realize that $\epsilon_i$ is not equivalent to the desired actuator noise strength $\epsilon_i^*$. The latter is the desired strength by which the actually realized design instances are tested. As was already stated in the beginning, due to the (μ,λ)-selection, the actual variances of the selected (i.e. parental) $\tilde{x}_{m;\lambda}$ states are usually smaller than the desired $\epsilon_1^*$.

Therefore, $\epsilon_i$ must be controlled in such a way that the observed (i.e. measured) standard deviation $$D_i := \sqrt{Var[\{(\tilde{x}_{1;\lambda})_i, \ldots, (\tilde{x}_{\mu;\lambda})_i\}]} \qquad (8)$$

gets close to $\epsilon_i$.

Given a stable estimate of the real parental population variance, one can compare it with the desired noise strength $\epsilon_i^*$.

That is, the aim is to control the observed parental population variance $D_i$ in such a way that $$D_i \approx \epsilon_i^* \qquad (9).$$

If the evolution strategy is able to get close to the robust optimizer, then the above condition ensures that robustness is guaranteed for the correct target noise strength. While, in general, one cannot be sure that the evolution strategy locates the robust optimizer, fulfilling the above condition can be ensured by the control rule $$\epsilon_i := \epsilon_i \exp[\tau_\epsilon \text{Sign}(\epsilon_i^* - D_i)] \qquad (10).$$

If $D_i = \epsilon_i^*$, the above equation does not change $\epsilon_i$. In case $D_i < \epsilon_i^*$, $\epsilon_i$ is increased and if $D_i > \epsilon_i^*$, $\epsilon_i$ is decreased. Due to the choice of the sign function, the ϵ change rate is independent of the actual value of the $D_i - \epsilon_i^*$ difference. This ensures that large differences do not result in extreme $\epsilon_i$ changes. As an alternative one might replace sign( ) by a sigmoid function, e.g. the hyperbolic tangent.

The choice of the parameter $\tau_\epsilon$, which may be interpreted as a damping constant, must be taken with care. The dynamics of the $D_i$ and $\epsilon_i$ interfere with each other. As a result, such a system can exhibit instabilities, e.g. oscillatory behavior. In order to prevent such instabilities, $c_x$ and $\tau_\epsilon$ must be chosen appropriately. While there is clearly a need for a thorough analysis, in the investigations done so far, the choice $$\tau_\epsilon = \frac{1}{3} c_x \qquad (11)$$

worked flawlessly.

d. Increasing/Controlling Population Size

In step 130 as shown in FIG. 1, it is checked whether the population size is to be adapted or not.

In order to control the population size λ, a measure is needed which allows for a decision whether to increase λ. Assuming a stationary actuator noise distribution, the dynamics of the evolution strategy will (usually) approach a steady state behavior in a certain vicinity of the optimizer. That is, for a certain time period one observes on average a measurable improvement in the observed parental fitness values. If, however, one reaches the vicinity of the steady state, parental fitness will start to fluctuate around an average value. Therefore, if one observes on average no improvements of the fitness values from generation g to g+1, it is time to increase the population size (a rule for λ-decrease has not been developed so far). The average parental fitness change ΔF is given by $$\Delta F = \langle F \rangle^{(g)} - \langle F \rangle^{(g-1)} \qquad (12)$$

where $$\langle F \rangle := \frac{1}{\mu} \sum_{m=1}^{\mu} \tilde{F}_{m;\lambda}. \qquad (13)$$

Since ΔF itself is a strongly fluctuating quantity, an exponential smoothing should be used to avoid unnecessary population increase due to random fluctuations, as in line 28 of the algorithm shown in FIG. 3, where $c_f$ determines the time constant by which ancient $\overline{\Delta F}$-information vanishes exponentially fast. As a natural choice, $$c_f := \frac{1}{N} \quad (14)$$

can be used.

As an update rule, the population size is increased at every $\Delta g$-th generation, if the (exponentially smoothed) average fitness change $\overline{\Delta F}$ is smaller than 0, whereby $\Delta g$ is an exogenous strategy parameter.

When considering maximization, desired fitness changes are of the kind $\Delta F>0$. Therefore, if $\Delta F \leqq 0$, the population size $\lambda$ should be increased. Since the increased population does not necessarily change the sign of $\Delta F$ in the next generation (random fluctuations), the test of the update rule in Line 29 is performed every $\Delta g$-th generation.

The $\lambda$-update itself is carried out in step 140 of FIG. 1 using the following formula:

$$\mu := \lfloor \mu c_\mu \rfloor \quad (15).$$

That is, the new $\mu$ is obtained from the old $\mu$ using the change rate $c_\mu$.

e. Terminating Condition

In step 150 it is checked whether the optimized state fulfils a predetermined criterion.

If yes, the procedure ends. If no, the procedure continues with the procreation of offspring in the next generation.

As termination conditions the standard stopping rules can be used:

Resource criteria:
    Maximum number of generations
    Maximum CPU-time
Convergence criteria:
    In the space of fitness values,
    In the space of object parameters,
    In the space of strategy parameters.

f. Concrete Implementation

A concrete example of an implementation of the above-described method is presented using pseudocode in FIG. 3 of this description, which is hereby incorporated into this description by reference.

Parameter initialization (step 100 in FIG. 1) is done on lines 1 to 10.

The procreation of offspring (step 110 in FIG. 1) is done on lines 11 to 16, with line 13 performing the log-normal mutation of recombined strategy parameter $\sigma$. In line 14, the mutation of the object parameters is performed according to the invention.

An intermediate recombination of the strategy parameter $\sigma$ is done on line 18 of FIG. 3, since it needs to be calculated only once per generation. The intermediate recombinant $\langle x \rangle$ is calculated on line 19 of FIG. 3.

Control of the actually observed fluctuation strength (step 120 in FIG. 1) is realized according to the invention on lines 20 to 26 of FIG. 3.

Control of the population size (steps 130 and 140) is realized according to the invention in lines 27 to 32 of FIG. 3.

There are three new exogenous strategy parameters to be fixed: The truncation ratio $\theta := \mu/\lambda$, the update time interval $\Delta g$, and the $\mu$ change rate $c_\mu$. Extensive simulations suggest $$\Delta g = N, c_\mu = 4$$

as a rule of thumb. That is, population upgrading should be done in a rather aggressive manner. The choice of the truncation ratio should be in the interval $$\theta = 0.4, \ldots, 0.6.$$

Figure 2:
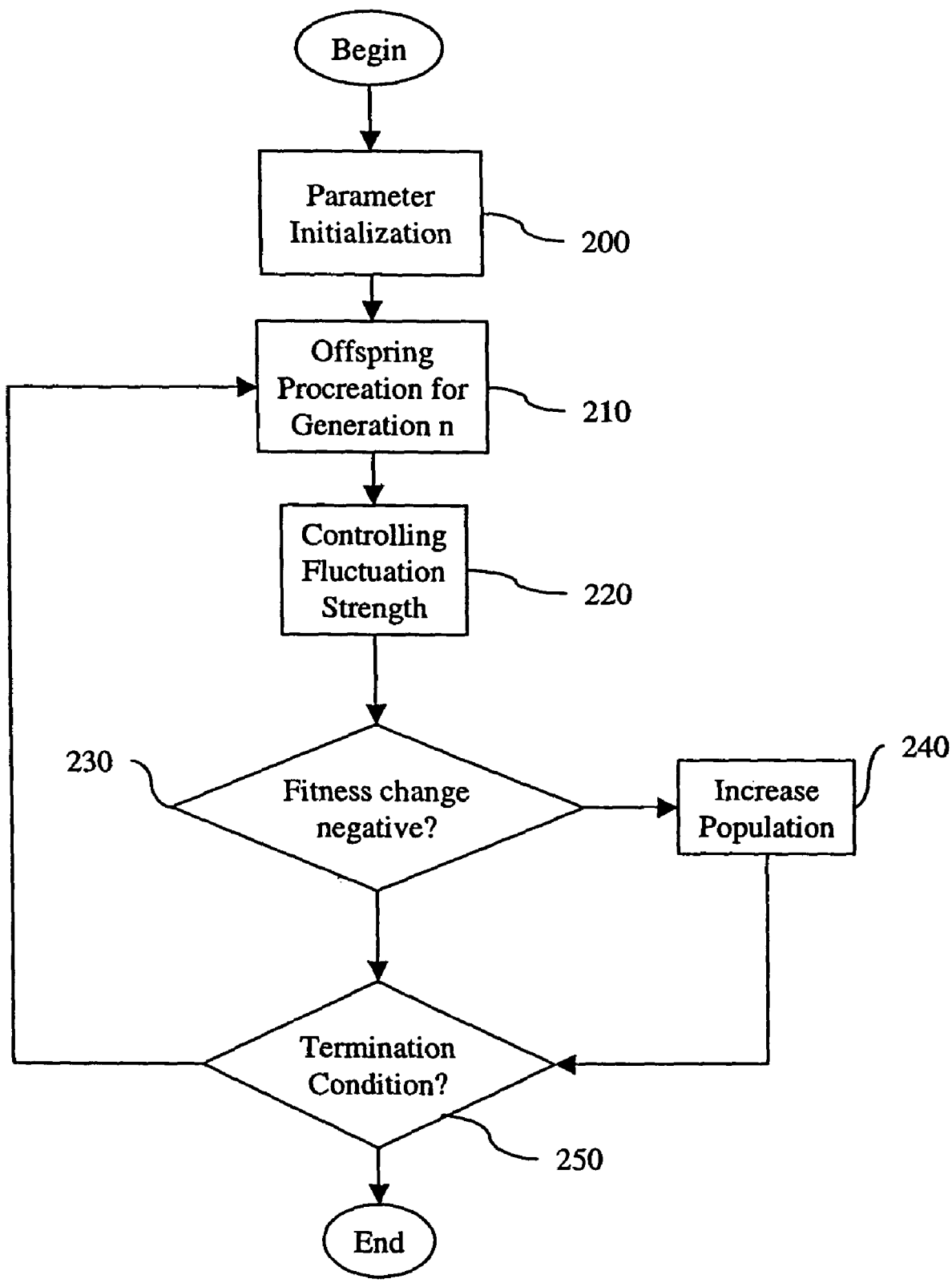
FIG. 2 is a schematic flow diagram of the optimization method according to another embodiment of the present invention.

The second embodiment of the invention shown in FIG. 2 is an adaptation of a different evolutionary strategy, known in the literature as cumulative step size adaptation (CSA).

Unlike the mutation strength adaptation by the previous embodiment described with reference to FIG. 1 that uses one-generation fitness ranking information only, the cumulative step size adaptation strategy relies on quality (fitness) related search space information gathered over a sequence of consecutive generations. In these strategies, the length of so-called evolution paths is used to control the variance $\sigma^2$ of the object parameter mutation operator. For a comprehensive introduction to CSA see Hansen, N. and Ostermeier, A, *"Completely Derandomized Self-Adaptation in Evolution Strategies"*, in: Evolutionary Computation, 9(2), p. 159 to 195.

Due to the special way how the mutation strength is determined in the CSA evolution strategy and how the offspring are generated using the same mutation strength $\sigma$ for all offspring individuals, there seems to be no direct way to transfer the idea of direct robustness testing through mutations to the CSA evolution strategy.

Therefore, the present embodiment employs a black-box approach: the evolution strategy is applied without modifications to the function $f(x)$ which is internally disturbed by actuator noise of strength $\epsilon$. Thus, one has to differentiate between the evolution strategies' individual vectors $\tilde{x}_l$ and the real actuator state $\tilde{x}_l^a$ entering the $f$ function. The latter is invisible to the employed evolution strategy, however, it is needed for calculating the actually realized parental actuator fluctuations measured by the standard deviation $D_l$.

In order to perform the path accumulation, the accumulation time constant $c_\sigma$ must be fixed. Two different recommendations concerning $c_\sigma$ can be found in the literature: $\propto 1/\sqrt{N}$ and $\propto 1/N$. From the viewpoint of stability $$c_\sigma = \frac{1}{N}$$

should be chosen. According to experimental evidences and theoretical analysis, the damping constant $d_\sigma$ must be chosen depending on $c_\sigma$ $$d_\sigma = \frac{1}{c_\sigma}$$

A concrete example of an implementation of the method described in relation to FIG. 2 is presented using pseudo-code in FIG. 4 of this description, which is hereby incorporated into this description by reference.

Parameter initialization (step 200 in FIG. 2) is done on lines 1 to 11.

The procreation of offspring (step 210 in FIG. 2) is done on lines 12 to 17. The evolution strategies' individual vectors $\tilde{x}_l$ are generated in Line 14 of FIG. 4 and the real actuator state $\tilde{x}_l^a$ entering the $f$ function is generated on Line 15 of FIG. 4.

The major difference to the method according to the first embodiment is located in Lines 20 and 21 of FIG. 4: the path cumulation and the a update.

Control of the actually observed fluctuation strength (step 220 in FIG. 1) is realized according to the invention on lines 22 to 29 of FIG. 4.

Control of the population size (steps 230 and 240) is realized according to the invention in lines 32 to 35 of FIG. 4.

The rest of the algorithm in FIG. 4 is directly taken from the first embodiment shown in FIG. 1 and FIG. 3. The same holds for the recommended choice of the endogenous strategy parameters $c_x$, $c_f$, $c_\mu$, and $\theta$.

The present invention finds application for all kinds of structure encoding.

Specific examples of application of the present invention apart from turbine blades are airfoil shapes and other aerodynamic or hydrodynamic structures. Other fields of application are architecture and civil engineering, computer science, wing design, engine valve design and scheduling problems.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer based method for optimizing a design of a hydrodynamic or aerodynamic structure, the method comprising the steps of:
   (a) creating an initial population of a plurality of individual parameter sets the parameter sets comprising object parameters describing the design to be optimized and setting the initial population as a current parent population;
   (b) for each individual parameter set in a parent population mutating, by the computer, the parameters and optionally recombining the parameters to create an offspring population of individual parameter sets, wherein a strength of an individual object parameter mutation is enlarged by a noise contribution, wherein the noise contribution is added to said individual object parameter value whereby the noise contribution is a mutation term, to enhance the robustness of the optimization;
   (c) evaluating, by the computer, a quality of each individual in the offspring population;
   (d) selecting individuals of the offspring population to be the next parent generation based upon said quality; and
   (e) repeating steps (b) through (d) until a termination criterion is reached to optimize the design.

2. The method of claim 1 wherein said parameter set includes strategy parameters.

3. The method of claim 1, wherein the strength of the noise contribution is adapted such that the estimated population variance substantially equals a prescribed variance governed by a robustness criterion.

4. The method of claim 1, wherein the noise contribution varies for the different object parameters of a given parameter set.

5. The method of claim 1 wherein the selection in step (c) is a deterministic $(\mu,\lambda)$ or $(\mu+\lambda)$ selection of evolution strategies.

6. The method of claim 1 wherein the center of mass recombination known in evolution strategies as $(\mu/\mu,\lambda)$ is used in step (b).

7. The method of claim 1 wherein the random source for mutation is normally distributed.

8. The method of claim 1, wherein the estimation of the population variance is subject to exponential smoothing.

9. A computer including a software program, which when executed by a computing device performs a method according to claim 1.

10. An apparatus programmed for executing a method according to claim 1.

11. A computer for optimizing a design of a hydrodynamic or aerodynamic structure, comprising:
   parameter sets means for creating an initial population of a plurality of individual parameter sets,
   the parameter sets comprising object parameters describing the design to be optimized and possibly strategy parameters and setting the initial population as the current parent population;
   mutating means, for each individual parameter set in the parent population, mutating the parameters and optionally recombining them, to create an offspring population of individual parameter sets, wherein a strength of an individual object parameter mutation is enlarged by a noise contribution, wherein the noise contribution is added to said individual object parameter value whereby the noise contribution is a mutation term, to enhance the robustness of the optimization;
   evaluating means for evaluating a quality of each individual in the offspring population;
   selecting means for selecting individuals of the offspring population to be the next parent generation based upon said quality; and
   terminating means for repeatedly implementing the mutating means, evaluating means and selecting means until a termination criterion is reached for optimizing the design;
   wherein the size of the population of parameter sets is varied, preferably increased depending on an average change in the evaluated quality with respect to a preceding population of parameter sets.

12. The system of claim 11, wherein said parameter set includes strategy parameters.

13. The system of claim 11, wherein the average change in quality is subject to exponential smoothing before deciding on a variation of the population size.

14. The system of claim 11, wherein the selection in step (c) is a deterministic $(\mu,\lambda)$ or $(\mu+\lambda)$ selection of evolution strategies.

15. The system of claim 11, wherein the center of mass recombination known in evolution strategies as $(\mu/\mu,\lambda)$ is used in step (b).

* * * * *